(12) United States Patent
Murphy et al.

(10) Patent No.: US 12,421,824 B2
(45) Date of Patent: Sep. 23, 2025

(54) USING EXPANDABLE METAL AS AN ALTERNATE TO EXISTING METAL TO METAL SEALS

(71) Applicant: Halliburton Energy Services, Inc., Houston, TX (US)

(72) Inventors: Robert Travis Murphy, Carrollton, TX (US); Terapat Apichartthabrut, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/334,731

(22) Filed: May 29, 2021

(65) Prior Publication Data

US 2022/0381108 A1 Dec. 1, 2022

(51) Int. Cl.
 *E21B 33/12* (2006.01)

(52) U.S. Cl.
 CPC .............................. *E21B 33/1212* (2013.01)

(58) Field of Classification Search
 CPC ..... E21B 33/121; E21B 43/106; E21B 17/043
 See application file for complete search history.

(56) References Cited

U.S. PATENT DOCUMENTS

| | | |
|---|---|---|
| 1,525,740 A | 2/1925 | Howard |
| 2,075,912 A | 4/1937 | Roye |
| 2,590,931 A | 4/1952 | Cabaniss |
| 2,743,781 A | 5/1956 | Lane |
| 2,865,454 A | 12/1958 | Richards |
| 3,206,536 A | 9/1965 | Goodloe |
| 3,371,716 A | 3/1968 | Current |
| 3,616,354 A | 10/1971 | Russell |
| 3,706,125 A | 12/1972 | Hopkins |
| 4,270,608 A | 6/1981 | Hendrickson |
| 4,424,859 A | 1/1984 | Sims |
| 4,424,861 A | 1/1984 | Carter |
| 4,442,908 A | 4/1984 | Steenbock |
| 4,446,932 A | 5/1984 | Hipp |
| 4,457,379 A | 7/1984 | McStravick |
| 4,527,815 A | 7/1985 | Frick |
| 4,977,636 A | 12/1990 | King |
| 4,979,585 A | 12/1990 | Chesnutt |
| 5,139,274 A | 8/1992 | Oseman |
| 5,220,959 A | 6/1993 | Vance |

(Continued)

FOREIGN PATENT DOCUMENTS

| | | |
|---|---|---|
| CA | 2820742 A1 | 9/2013 |
| CN | 203308412 U | 11/2013 |

(Continued)

*Primary Examiner* — Nicole Coy
*Assistant Examiner* — Nicholas D Wlodarski
(74) *Attorney, Agent, or Firm* — Scott Richardson; Parker Justiss, P.C.

(57) ABSTRACT

Provided is a seal assembly, a method for sealing, and a well system. The seal assembly, in one aspect, includes a pipe having an outer tubular positioned thereabout, the outer tubular and pipe forming an enclosed seal gland. The seal assembly, according to this aspect, further includes expanded metal positioned within the enclosed seal gland, the expanded metal comprising a metal that has expanded in response to hydrolysis to assist in sealing the enclosed seal gland.

13 Claims, 10 Drawing Sheets

(56) References Cited

U.S. PATENT DOCUMENTS

| | | |
|---|---|---|
| 5,424,139 A | 6/1995 | Shuler |
| 5,492,173 A | 2/1996 | Kilgore |
| 5,517,981 A | 5/1996 | Taub et al. |
| 5,662,341 A | 9/1997 | Ezell et al. |
| 5,667,015 A | 9/1997 | Harestad |
| 5,803,173 A | 9/1998 | Fraser et al. |
| 6,089,320 A | 7/2000 | LaGrange |
| 6,106,024 A | 8/2000 | Herman et al. |
| 6,840,325 B2 | 1/2005 | Stephenson |
| 6,907,930 B2 | 6/2005 | Cavender |
| 6,942,039 B2 | 9/2005 | Tinker |
| 7,104,322 B2 | 9/2006 | Whanger et al. |
| 7,152,687 B2 | 12/2006 | Gano |
| 7,322,408 B2 | 1/2008 | Howlett |
| 7,347,274 B2 | 3/2008 | Patel |
| 7,350,590 B2 | 4/2008 | Hosie et al. |
| 7,402,277 B2 | 7/2008 | Ayer |
| 7,578,043 B2 | 8/2009 | Simpson et al. |
| 7,673,688 B1 | 3/2010 | Jones |
| 7,677,303 B2 | 3/2010 | Coronado |
| 7,696,275 B2 | 4/2010 | Slay et al. |
| 7,963,321 B2 | 6/2011 | Kutac |
| 7,996,945 B2 | 8/2011 | Nosker |
| 8,042,841 B2 | 10/2011 | Viegener |
| 8,109,339 B2 | 2/2012 | Xu |
| 8,225,861 B2 | 7/2012 | Foster et al. |
| 8,266,751 B2 | 9/2012 | He |
| 8,430,176 B2 | 4/2013 | Xu |
| 8,453,736 B2 | 6/2013 | Constantine |
| 8,459,367 B2 | 6/2013 | Nutley et al. |
| 8,469,084 B2 | 6/2013 | Clark et al. |
| 8,490,707 B2 | 7/2013 | Robisson |
| 8,579,024 B2 | 11/2013 | Mailand et al. |
| 8,684,096 B2 | 4/2014 | Harris |
| 8,794,330 B2 | 8/2014 | Stout |
| 8,807,209 B2 | 8/2014 | King |
| 8,875,800 B2 | 11/2014 | Wood et al. |
| 8,894,070 B2 | 11/2014 | Bhat et al. |
| 8,993,491 B2 | 3/2015 | James |
| 9,004,173 B2 | 4/2015 | Richard |
| 9,217,311 B2 | 12/2015 | Slup |
| 9,249,904 B2 | 2/2016 | Duquette |
| 9,279,295 B2 | 3/2016 | Williamson et al. |
| 9,347,272 B2 | 5/2016 | Hewson et al. |
| 9,353,606 B2 | 5/2016 | Bruce et al. |
| 9,393,601 B2 | 7/2016 | Ranck |
| 9,404,030 B2 | 8/2016 | Mazyar |
| 9,534,460 B2 | 1/2017 | Watson et al. |
| 9,611,715 B1 | 4/2017 | Smith |
| 9,644,459 B2 | 5/2017 | Themig |
| 9,708,880 B2 | 7/2017 | Solhaug |
| 9,725,979 B2 | 8/2017 | Mazyar et al. |
| 9,732,578 B2 | 8/2017 | McRobb |
| 9,745,451 B2 | 8/2017 | Zhao et al. |
| 9,765,595 B2 | 9/2017 | Themig et al. |
| 9,771,510 B2 | 9/2017 | James et al. |
| 9,945,190 B2 | 4/2018 | Crowley |
| 9,976,380 B2 | 5/2018 | Davis et al. |
| 9,976,381 B2 | 5/2018 | Martin et al. |
| 10,030,467 B2 | 7/2018 | Al-Gouhi |
| 10,060,225 B2 | 8/2018 | Wolf |
| 10,119,011 B2 | 11/2018 | Zhao et al. |
| 10,179,873 B1 | 1/2019 | Meng |
| 10,316,601 B2 | 6/2019 | Walton et al. |
| 10,337,298 B2 | 7/2019 | Braddick |
| 10,344,570 B2 | 7/2019 | Steele |
| 10,352,109 B2 | 7/2019 | Sanchez |
| 10,364,636 B2 | 7/2019 | Davis |
| 10,472,933 B2 | 11/2019 | Steele |
| 10,533,392 B2 | 1/2020 | Walton et al. |
| 10,718,183 B2 | 7/2020 | Bruce et al. |
| 10,758,974 B2 | 9/2020 | Sherman |
| 10,794,152 B2 | 10/2020 | Lang et al. |
| 10,961,804 B1 | 3/2021 | Fripp |
| 11,359,448 B2 | 6/2022 | Fripp |
| 11,365,611 B2 | 6/2022 | Gibb |
| 11,428,066 B2 | 8/2022 | Andersen |
| 11,512,552 B2 | 11/2022 | Fripp |
| 2002/0088616 A1 | 7/2002 | Swor et al. |
| 2003/0132001 A1 | 7/2003 | Wilson |
| 2003/0164236 A1 | 9/2003 | Thornton |
| 2003/0164237 A1 | 9/2003 | Butterfield, Jr. |
| 2003/0205377 A1 | 11/2003 | Streater |
| 2004/0194970 A1 | 10/2004 | Eatwell |
| 2005/0051333 A1 | 3/2005 | Weber |
| 2005/0061369 A1 | 3/2005 | De Almeida |
| 2005/0072576 A1 | 4/2005 | Henriksen |
| 2005/0093250 A1 | 5/2005 | Santi et al. |
| 2005/0199401 A1 | 9/2005 | Patel et al. |
| 2006/0144591 A1 | 7/2006 | Gonzalez |
| 2006/0272806 A1 | 12/2006 | Wilkie et al. |
| 2007/0089875 A1 | 4/2007 | Steele et al. |
| 2007/0089910 A1 | 4/2007 | Hewson et al. |
| 2007/0095532 A1 | 5/2007 | Head |
| 2007/0137826 A1 | 6/2007 | Bosma et al. |
| 2007/0144734 A1 | 6/2007 | Xu et al. |
| 2007/0151724 A1 | 7/2007 | Ohmer et al. |
| 2007/0163781 A1 | 7/2007 | Walker |
| 2007/0221387 A1 | 9/2007 | Levy |
| 2007/0246213 A1 | 10/2007 | Hailey |
| 2007/0267824 A1 | 11/2007 | Baugh et al. |
| 2007/0277979 A1 | 12/2007 | Todd et al. |
| 2008/0047708 A1 | 2/2008 | Spencer |
| 2008/0135249 A1 | 6/2008 | Fripp |
| 2008/0149351 A1 | 6/2008 | Marya |
| 2008/0290603 A1 | 11/2008 | Laflin |
| 2009/0014173 A1 | 1/2009 | Macleod |
| 2009/0084555 A1 | 4/2009 | Lee |
| 2009/0102133 A1 | 4/2009 | Ruddock |
| 2009/0159278 A1 | 6/2009 | Corre |
| 2009/0200028 A1 | 8/2009 | Dewar |
| 2009/0250227 A1 | 10/2009 | Brown et al. |
| 2009/0250228 A1 | 10/2009 | Loretz |
| 2009/0272546 A1 | 11/2009 | Nutley et al. |
| 2009/0321087 A1 | 12/2009 | Victorov |
| 2010/0072711 A1 | 3/2010 | Doane |
| 2010/0078173 A1 | 4/2010 | Buytaert et al. |
| 2010/0096143 A1* | 4/2010 | Angman ............ E21B 17/1085 166/380 |
| 2010/0108148 A1 | 5/2010 | Chen |
| 2010/0122819 A1 | 5/2010 | Wildman |
| 2010/0139930 A1 | 6/2010 | Patel |
| 2010/0155083 A1 | 6/2010 | Lynde et al. |
| 2010/0181080 A1 | 7/2010 | Levy |
| 2010/0225107 A1 | 9/2010 | Tverlid |
| 2010/0257913 A1 | 10/2010 | Storm, Jr. et al. |
| 2010/0307737 A1 | 12/2010 | Mellemstrand |
| 2011/0061876 A1 | 3/2011 | Johnson et al. |
| 2011/0098202 A1 | 4/2011 | James |
| 2011/0147014 A1 | 6/2011 | Chen et al. |
| 2012/0018143 A1 | 1/2012 | Lembcke |
| 2012/0048531 A1 | 3/2012 | Marzouk |
| 2012/0048561 A1 | 3/2012 | Holderman |
| 2012/0048623 A1 | 3/2012 | Lafuente et al. |
| 2012/0049462 A1 | 3/2012 | Pitman |
| 2012/0168147 A1 | 7/2012 | Bowersock |
| 2012/0175134 A1 | 7/2012 | Robisson |
| 2012/0273236 A1 | 11/2012 | Gandikota et al. |
| 2013/0048289 A1 | 2/2013 | Mazyar et al. |
| 2013/0056207 A1 | 3/2013 | Wood et al. |
| 2013/0081815 A1 | 4/2013 | Mazyar et al. |
| 2013/0152824 A1 | 6/2013 | Crews |
| 2013/0153236 A1 | 6/2013 | Bishop |
| 2013/0161006 A1 | 6/2013 | Robisson et al. |
| 2013/0186615 A1 | 7/2013 | Hallunbaek et al. |
| 2013/0192853 A1 | 8/2013 | Themig |
| 2013/0292117 A1 | 11/2013 | Robisson |
| 2014/0026335 A1 | 1/2014 | Smith |
| 2014/0034308 A1 | 2/2014 | Holderman |
| 2014/0051612 A1 | 2/2014 | Mazyar |
| 2014/0262352 A1 | 9/2014 | Lembcke |
| 2015/0021049 A1 | 1/2015 | Davis et al. |
| 2015/0075768 A1 | 3/2015 | Wright et al. |
| 2015/0101813 A1 | 4/2015 | Zhao |

(56) References Cited

U.S. PATENT DOCUMENTS

| | | |
|---|---|---|
| 2015/0113913 A1 | 4/2015 | Kim |
| 2015/0184486 A1 | 7/2015 | Epstein |
| 2015/0233190 A1 | 8/2015 | Wolf et al. |
| 2015/0275587 A1 | 10/2015 | Wolf et al. |
| 2015/0337615 A1 | 11/2015 | Epstein et al. |
| 2015/0345248 A1 | 12/2015 | Carragher |
| 2015/0368990 A1 | 12/2015 | Jewett |
| 2015/0369003 A1 | 12/2015 | Hajjari et al. |
| 2016/0024896 A1 | 1/2016 | Johnson et al. |
| 2016/0024902 A1 | 1/2016 | Richter |
| 2016/0137912 A1 | 5/2016 | Sherman et al. |
| 2016/0138359 A1 | 5/2016 | Zhao |
| 2016/0145488 A1 | 5/2016 | Aines et al. |
| 2016/0145968 A1 | 5/2016 | Marya |
| 2016/0177668 A1 | 6/2016 | Watson et al. |
| 2016/0194936 A1 | 7/2016 | Allen |
| 2016/0208569 A1 | 7/2016 | Anderson et al. |
| 2016/0230495 A1 | 8/2016 | Mazyar et al. |
| 2016/0273312 A1 | 9/2016 | Steele et al. |
| 2016/0319633 A1 | 11/2016 | Cooper et al. |
| 2016/0326830 A1 | 11/2016 | Hallundbaek |
| 2016/0326849 A1 | 11/2016 | Bruce |
| 2016/0333187 A1 | 11/2016 | Bauer et al. |
| 2017/0015824 A1 | 1/2017 | Gozalo |
| 2017/0022778 A1 | 1/2017 | Fripp et al. |
| 2017/0107419 A1 | 4/2017 | Roy et al. |
| 2017/0107794 A1 | 4/2017 | Steele |
| 2017/0113275 A1 | 4/2017 | Roy et al. |
| 2017/0159401 A1 | 6/2017 | Saltel et al. |
| 2017/0175487 A1 | 6/2017 | Marcin et al. |
| 2017/0175488 A1 | 6/2017 | Lisowski |
| 2017/0191342 A1 | 7/2017 | Turley |
| 2017/0198191 A1 | 7/2017 | Potapenko |
| 2017/0234103 A1 | 8/2017 | Frazier |
| 2017/0306714 A1 | 10/2017 | Haugland |
| 2017/0314372 A1 | 11/2017 | Tolman |
| 2017/0350237 A1 | 12/2017 | Giem et al. |
| 2017/0356266 A1 | 12/2017 | Arackakudiyil |
| 2018/0023362 A1 | 1/2018 | Makowiecki et al. |
| 2018/0023366 A1 | 1/2018 | Deng et al. |
| 2018/0038193 A1 | 2/2018 | Walton |
| 2018/0080304 A1 | 3/2018 | Cortez et al. |
| 2018/0081468 A1 | 3/2018 | Bruce et al. |
| 2018/0086894 A1 | 3/2018 | Roy |
| 2018/0087350 A1 | 3/2018 | Sherman |
| 2018/0094508 A1 | 4/2018 | Smith et al. |
| 2018/0100367 A1 | 4/2018 | Perez |
| 2018/0128072 A1 | 5/2018 | Larsen |
| 2018/0128082 A1 | 5/2018 | Hollan et al. |
| 2018/0209234 A1 | 7/2018 | Manera |
| 2018/0223624 A1 | 8/2018 | Fripp |
| 2018/0298708 A1 | 10/2018 | Schmidt et al. |
| 2018/0334882 A1 | 11/2018 | Brandsdal |
| 2018/0347288 A1 | 12/2018 | Fripp |
| 2018/0363409 A1 | 12/2018 | Frazier |
| 2019/0016951 A1 | 1/2019 | Sherman et al. |
| 2019/0032435 A1 | 1/2019 | Kochanek et al. |
| 2019/0039126 A1 | 2/2019 | Sherman |
| 2019/0078414 A1 | 3/2019 | Frazier |
| 2019/0128092 A1 | 5/2019 | Mueller et al. |
| 2019/0136666 A1 | 5/2019 | Kent |
| 2019/0178054 A1 | 6/2019 | Bruce |
| 2019/0186228 A1 | 6/2019 | Beckett et al. |
| 2019/0225861 A1 | 7/2019 | Reddy |
| 2019/0249510 A1 | 8/2019 | Deng et al. |
| 2019/0316025 A1 | 10/2019 | Sherman |
| 2019/0383115 A1 | 12/2019 | Lees |
| 2020/0032574 A1 | 1/2020 | Fripp et al. |
| 2020/0056435 A1 | 2/2020 | Sherman |
| 2020/0072019 A1 | 3/2020 | Onti et al. |
| 2020/0080401 A1 | 3/2020 | Sherman |
| 2020/0080402 A1 | 3/2020 | Lang et al. |
| 2020/0240235 A1 | 7/2020 | Fripp et al. |
| 2020/0308945 A1 | 10/2020 | Surjaatmadja et al. |
| 2020/0325749 A1 | 10/2020 | Fripp et al. |
| 2020/0362224 A1 | 11/2020 | Wellhoefer |
| 2020/0370391 A1 | 11/2020 | Fripp et al. |
| 2021/0017835 A1 | 1/2021 | Pelto et al. |
| 2021/0040810 A1 | 2/2021 | Evers |
| 2021/0123310 A1 | 4/2021 | Fripp et al. |
| 2021/0123319 A1 | 4/2021 | Greci |
| 2021/0172286 A1 | 6/2021 | Barlow |
| 2021/0187604 A1 | 6/2021 | Sherman et al. |
| 2021/0270093 A1 | 9/2021 | Fripp |
| 2021/0270103 A1 | 9/2021 | Greci et al. |
| 2021/0332673 A1 | 10/2021 | Fripp |
| 2021/0363849 A1 | 11/2021 | Al Yahya |
| 2022/0106847 A1 | 4/2022 | Dahl |
| 2022/0186575 A1 | 6/2022 | Fripp |
| 2022/0205336 A1* | 6/2022 | Asthana ............ E21B 33/1212 |
| 2022/0372837 A1 | 11/2022 | Holderman et al. |

FOREIGN PATENT DOCUMENTS

| | | |
|---|---|---|
| CN | 205422632 U | 8/2016 |
| CN | 107148444 A | 9/2017 |
| CN | 108194756 A | 6/2018 |
| CN | 107148444 B | 1/2019 |
| CN | 108194756 B | 8/2020 |
| EP | 15726 A1 | 9/1980 |
| EP | 869257 A2 | 10/1998 |
| EP | 940558 A1 | 9/1999 |
| EP | 0940558 B1 | 1/2005 |
| EP | 1757770 A1 | 2/2007 |
| EP | 1910728 A1 | 4/2008 |
| EP | 1910728 B1 | 9/2009 |
| EP | 2447466 A2 | 5/2012 |
| EP | 2501890 A2 | 9/2012 |
| EP | 2501890 B | 7/2014 |
| EP | 2447466 A3 | 3/2017 |
| EP | 3144018 A1 | 3/2017 |
| EP | 3144018 A4 | 5/2017 |
| EP | 3196402 A1 | 7/2017 |
| EP | 3144018 B1 | 9/2018 |
| EP | 2447466 B1 | 10/2018 |
| GB | 2444060 A | 5/2008 |
| GB | 2444060 B | 12/2008 |
| JP | 2003090037 A | 3/2003 |
| JP | 2003293354 A | 10/2003 |
| JP | 2004169303 A | 6/2004 |
| JP | 2015175449 A | 10/2015 |
| KR | 20020014619 A | 2/2002 |
| KR | 20080096576 A | 10/2008 |
| WO | 02/02900 A2 | 1/2002 |
| WO | 02/02900 A3 | 5/2002 |
| WO | 02/02900 A8 | 12/2003 |
| WO | 2005/022012 A1 | 3/2005 |
| WO | 2006/045794 A1 | 5/2006 |
| WO | 2007/047089 A1 | 4/2007 |
| WO | 2012/094322 A2 | 7/2012 |
| WO | 2012/125660 A2 | 9/2012 |
| WO | 2012/094322 A3 | 10/2012 |
| WO | 2012/125660 A3 | 2/2013 |
| WO | 2014/028149 A1 | 2/2014 |
| WO | 2014/182301 A1 | 11/2014 |
| WO | 2014/193042 A1 | 12/2014 |
| WO | 2015/057338 A1 | 4/2015 |
| WO | 2015/069886 A2 | 5/2015 |
| WO | 2015/069886 A3 | 9/2015 |
| WO | 2015/183277 A1 | 12/2015 |
| WO | 2016/000068 A1 | 1/2016 |
| WO | 2016/171666 A1 | 10/2016 |
| WO | 2017/100417 A1 | 6/2017 |
| WO | 2018/055382 A1 | 3/2018 |
| WO | WO-2019094044 A1 * | 5/2019 ............ E21B 33/10 |
| WO | 2019/122857 A1 | 6/2019 |
| WO | 2019/147285 A1 | 8/2019 |
| WO | 2019/151870 A1 | 8/2019 |
| WO | 2019/164499 A1 | 8/2019 |
| WO | 2020/005252 A1 | 1/2020 |
| WO | 2020/141203 A1 | 7/2020 |
| WO | 2019/164499 A8 | 8/2020 |
| WO | 2020/167288 A1 | 8/2020 |
| WO | 2020/204940 A1 | 10/2020 |

(56) References Cited

FOREIGN PATENT DOCUMENTS

| WO | 2021/034325 A1 | 2/2021 |
| WO | 2021/086317 A1 | 5/2021 |
| WO | 2021/096519 A1 | 5/2021 |
| WO | 2021/126279 A1 | 6/2021 |

\* cited by examiner

USING EXPANDABLE METAL AS AN ALTERNATE TO EXISTING METAL TO METAL SEALS

BACKGROUND

Metal seals are sometimes used to seal between structures in well tools, and in equipment used in other environments. However, several problems are frequently encountered when metal seals are used. For example, metal seals require very smooth and clean surfaces to seal against, and most metals can only be elastically deformed to a limited extent (which thereby limits the biasing force available from elastically deforming a metal seal), etc.

Elastomeric and other types of nonmetal seals may provide the ability to seal against irregular and unclean surfaces, and may provide sufficient resilient biasing force for urging the seals against the surfaces. However, nonmetal seals tend to degrade rapidly when used in dynamic configurations, i.e., where the seal must contact a moving surface while sealing against a pressure differential, or where the seal loses contact with the surface while the pressure differential still exists across the seal.

BRIEF DESCRIPTION

Reference is now made to the following descriptions taken in conjunction with the accompanying drawings, in which.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Figure 1:
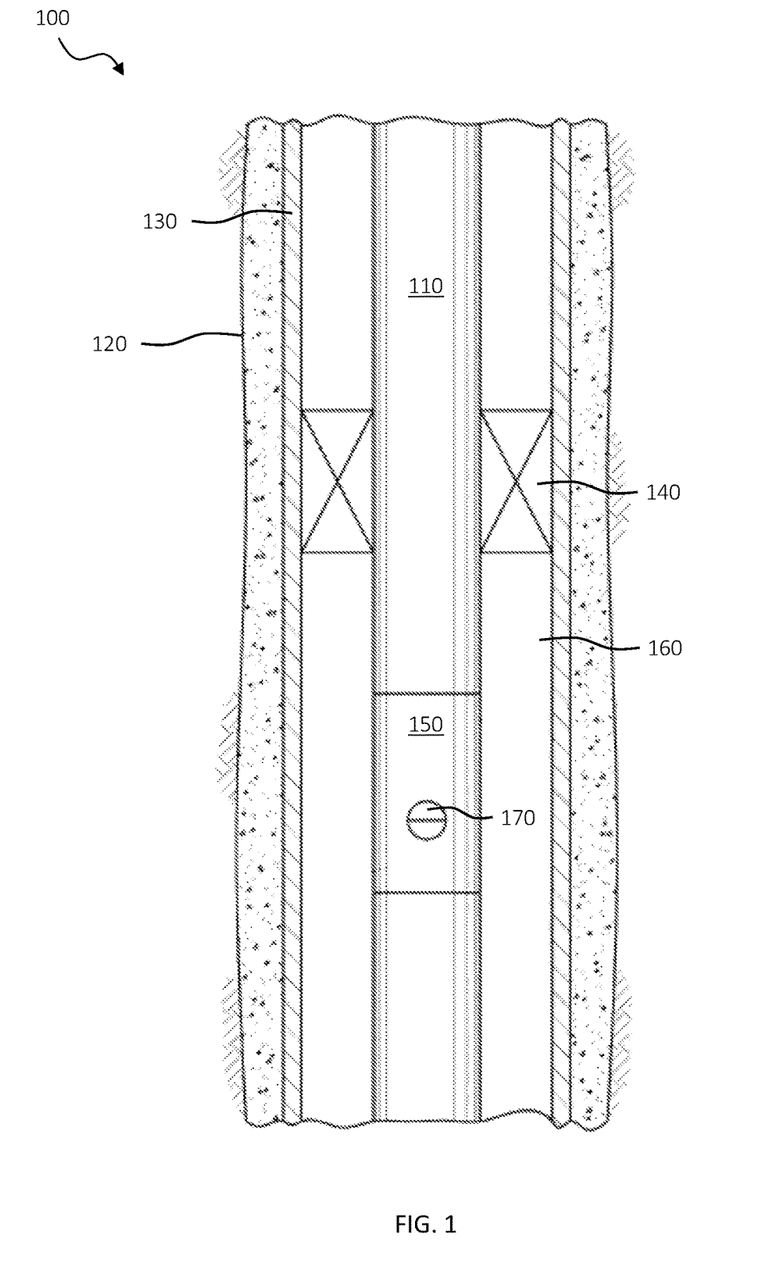
FIG. 1 depicts a well system including a seal assembly designed, manufactured, and run according to the present disclosure.

Referring initially to FIG. 1, schematically illustrated is a well system 100, including a seal assembly designed, manufactured, and run according to the present disclosure. In the well system 100, a tubular 110 (such as a production tubing string) is positioned in a wellbore 120. In at least one embodiment, the wellbore 120 is lined with casing 130, for example using cement in one or more embodiments.

In the illustrated embodiment, downhole tools 140, 150 are coupled to the tubular 110. In at least one embodiment, the downhole tool 140 is a packer, and the downhole tool 150 is a flow control device (such as a valve or choke). In at least one embodiment, the packer provides an annular seal between the tubular 110 and the casing 130, and the flow control device regulates fluid communication between the interior of the tubular 110 and an annulus 160 formed between the tubular 110 and the casing 130. For example, the downhole tool 150 comprising the flow control device might include a closure mechanism 170, which is operated to regulate flow.

In accordance with the disclosure, one or more of the downhole tools 140, 150 include a seal assembly (not shown) designed, manufactured, and operated according to one aspect of the disclosure. The seal assembly, in accordance with one or more embodiments, includes a pipe (e.g., mandrel, base pipe, tubing, pup joint, or any other oilfield tube shaped structure, as well as an outer tubular (e.g., outer tubing, outer housing, etc.) positioned around the pipe. In at least one embodiment, the outer tubular of the seal assembly could coincide with the tubular 110. In yet another embodiment, the outer tubular of the seal assembly is a different tubular than the tubular 110.

The pipe and outer tubular of the seal assembly, in at least one embodiment, form an enclosed seal gland. The term enclosed seal gland, as used herein, is intended to exclude the annulus 160 between the wellbore casing 130 and the tubular 110. The term enclosed seal gland, as used herein, it intended to reference an easily recognizable and defined volume. In at least one embodiment, the defined volume for the seal gland is 230 cm$^3$ or less. In at least one other embodiment, the defined volume for the seal gland is 100 cm³ or less, and in yet another embodiment 20 cm³ or less. While the enclosed seal gland may have leakage paths that enter and exit it, the enclosed seal gland is not a vast open space with limited boundaries.

In accordance with the disclosure, pre-expansion expandable metal is positioned within the enclosed seal gland, the pre-expansion expandable metal subjected to reactive fluid to form expanded metal within the enclosed seal gland. The expanded metal, in accordance with one or more aspects of the disclosure, comprises a metal that has expanded in response to hydrolysis to assist in sealing the enclosed seal gland. In certain embodiments, the expanded metal includes residual unreacted metal. For example, in certain embodiments the expanded metal is intentionally designed to include the residual unreacted metal. The residual unreacted metal has the benefit of allowing the expanded metal to self-heal if cracks or other anomalies subsequently arise, or for example to accommodate changes in the outer tubular or pipe diameter due to variations in temperature and/or pressure. Nevertheless, other embodiments may exist wherein no residual unreacted metal exists in the expanded metal.

The pre-expansion expandable metal, in some embodiments, may be described as expanding to a cement like material. In other words, the pre-expansion expandable metal goes from metal to micron-scale particles and then these particles expand and lock together to, in essence, assist in sealing the enclosed seal gland. The reaction may, in certain embodiments, occur in less than 2 days in a reactive fluid and in downhole temperatures. Nevertheless, the time of reaction may vary depending on the reactive fluid, the expandable metal used, and the downhole temperature. In certain other embodiments, the reaction occurs uphole, for example by soaking the pre-expansion expandable metal located in the enclosed seal gland in the reactive fluid.

In some embodiments, the reactive fluid may be a brine solution such as may be produced during well completion activities, and in other embodiments, the reactive fluid may be one of the additional solutions discussed herein. The pre-expansion expandable metal is electrically conductive in certain embodiments. The pre-expansion expandable metal may be machined to any specific size/shape, extruded, formed, cast or other conventional ways to get the desired shape of a metal, as will be discussed in greater detail below. The pre-expansion expandable metal, in certain embodiments has a yield strength greater than about 8,000 psi, e.g., 8,000 psi+/−50%.

The hydrolysis of the metal can create a metal hydroxide. The formative properties of alkaline earth metals (Mg—Magnesium, Ca—Calcium, etc.) and transition metals (Zn—Zinc, Al—Aluminum, etc.) under hydrolysis reactions demonstrate structural characteristics that are favorable for use with the present disclosure. Hydration results in an increase in size from the hydration reaction and results in a metal hydroxide that can precipitate from the fluid.

The hydration reactions for magnesium is:

where $Mg(OH)_2$ is also known as brucite. Another hydration reaction uses aluminum hydrolysis. The reaction forms a material known as Gibbsite, bayerite, boehmite, aluminum oxide, and norstrandite, depending on form. The possible hydration reactions for aluminum are:

Another hydration reaction uses calcium hydrolysis. The hydration reaction for calcium is:

Where $Ca(OH)_2$ is known as portlandite and is a common hydrolysis product of Portland cement. Magnesium hydroxide and calcium hydroxide are considered to be relatively insoluble in water. Aluminum hydroxide can be considered an amphoteric hydroxide, which has solubility in strong acids or in strong bases. Alkaline earth metals (e.g., Mg, Ca, etc.) work well for the expandable metal, but transition metals (Al, etc.) also work well for the expandable metal. In one embodiment, the metal hydroxide is dehydrated by the swell pressure to form a metal oxide.

In an embodiment, the metal used can be a metal alloy. The metal alloy can be an alloy of the base metal with other elements in order to either adjust the strength of the metal alloy, to adjust the reaction time of the metal alloy, or to adjust the strength of the resulting metal hydroxide byproduct, among other adjustments. The metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the alloy can be alloyed with a dopant that promotes corrosion, such as Ni—Nickel, Fe—Iron, Cu—Copper, Co—Cobalt, Ir—Iridium, Au—Gold, C— Carbon, Ga—Gallium, In—Indium, Mg—Mercury, Bi—Bismuth, Sn—Tin, and Pd—Palladium. The metal alloy can be constructed in a solid solution process where the elements are combined with molten metal or metal alloy. Alternatively, the metal alloy could be constructed with a powder metallurgy process. The metal can be cast, forged, extruded, sintered, welded, mill machined, lathe machined, stamped, eroded or a combination thereof. The metal alloy can be a mixture of the metal and metal oxide. For example, a powder mixture of aluminum and aluminum oxide can be ball-milled together to increase the reaction rate.

Optionally, non-expanding components may be added to the starting metallic materials. For example, ceramic, elastomer, plastic, epoxy, glass, or non-reacting metal components can be embedded in the expanding metal or coated on the surface of the metal. Alternatively, the starting metal may be the metal oxide. For example, calcium oxide (CaO) with water will produce calcium hydroxide in an energetic reaction. Due to the higher density of calcium oxide, this can have a 260% volumetric expansion when converting 1 mole of CaO goes from 9.5 cc to 34.4 cc of volume. In one variation, the expanding metal is formed in a serpentinite reaction, a hydration and metamorphic reaction. In one variation, the resultant material resembles a mafic material. Additional ions can be added to the reaction, including silicate, sulfate, aluminate, carbonate, and phosphate. The metal can be alloyed to increase the reactivity or to control the formation of oxides.

The pre-expansion expandable metal can be configured in many different fashions, as long as an adequate volume of material is available for fully expanding. For example, the pre-expansion expandable metal may be formed into a single long member, multiple short members, rings, among others. In certain other embodiments, the pre-expansion expandable metal is a collection of individual separate chunks of the metal held together with a binding agent proximate the enclosed seal gland. In yet other embodiments, the pre-expansion expandable metal is a collection of individual separate chunks of the metal that are not held together with a binding agent. Additionally, a coating may be applied to one or more portions of the pre-expansion expandable metal to delay the expanding reactions.

A seal assembly according to the present disclosure has many benefits over previous seal assemblies. In at least one embodiment, the seal assembly including the expanded metal provides for a design that is form-fitting with existing elastomeric seal cross-sections, and thus is not limited by certain seal surface tolerances and/or surface finishes. Accordingly, the cost of the seal pipe and/or outer tubular will be reduced, as the proposed expanded metal will form to the existing geometry and/or surface finish in the seal assembly. Additionally, the use of the pre-expansion expandable metal allows for a reduction in installation force and/or reduction in the chance of galling the seal surfaces, as the pre-expansion expandable metal has greater clearances during the installation or assembly thereof. Furthermore, the use of the pre-expansion expandable metal allows for the compensation of any eccentricities or non-uniformness in either the pipe or the outer tubular. Moreover, the use of the pre-expansion expandable metal allows for the seal to be placed at or near a weld bead, small feature, or non-circular cross-section.

At this point, it should be reiterated that the principles of this disclosure are not limited to any of the details of the well system 100 described herein. For example, it is not necessary for the seal assembly of this disclosure to be used in a wellbore, in a downhole tool, in a cased wellbore, in a flow control device, in an outer tubular, etc. Thus, it should be clearly understood that the well system 100 is only a single example of a wide variety of uses for a seal assembly designed, manufactured, and operated according to one or more aspects of the disclosure.

Figure 2A:
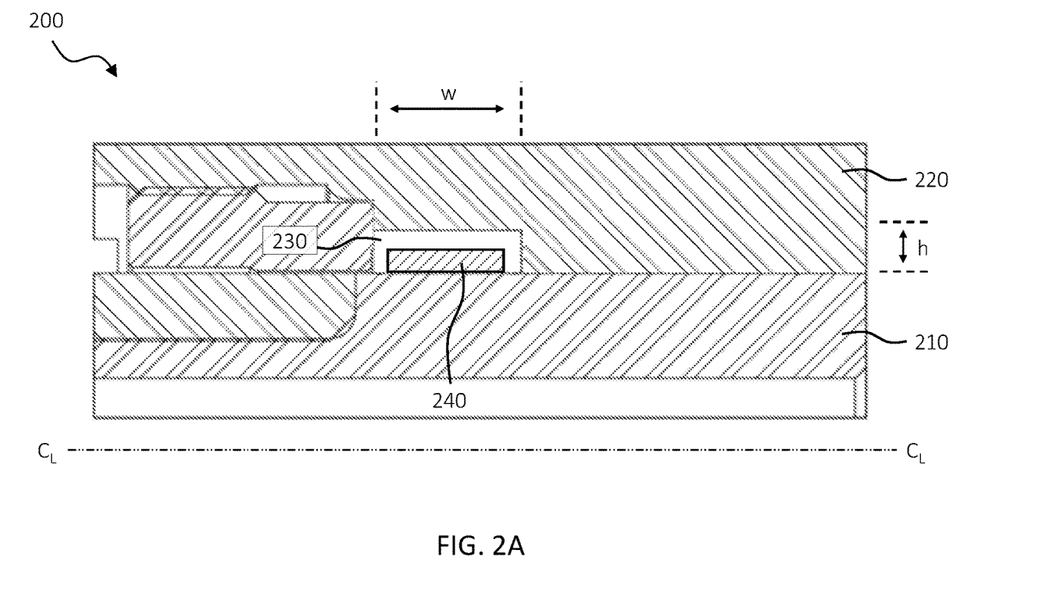
FIGS. 2A and 2B depict various different manufacturing states for a seal assembly designed, manufactured, and operated according to the disclosure.
Figure 2B:
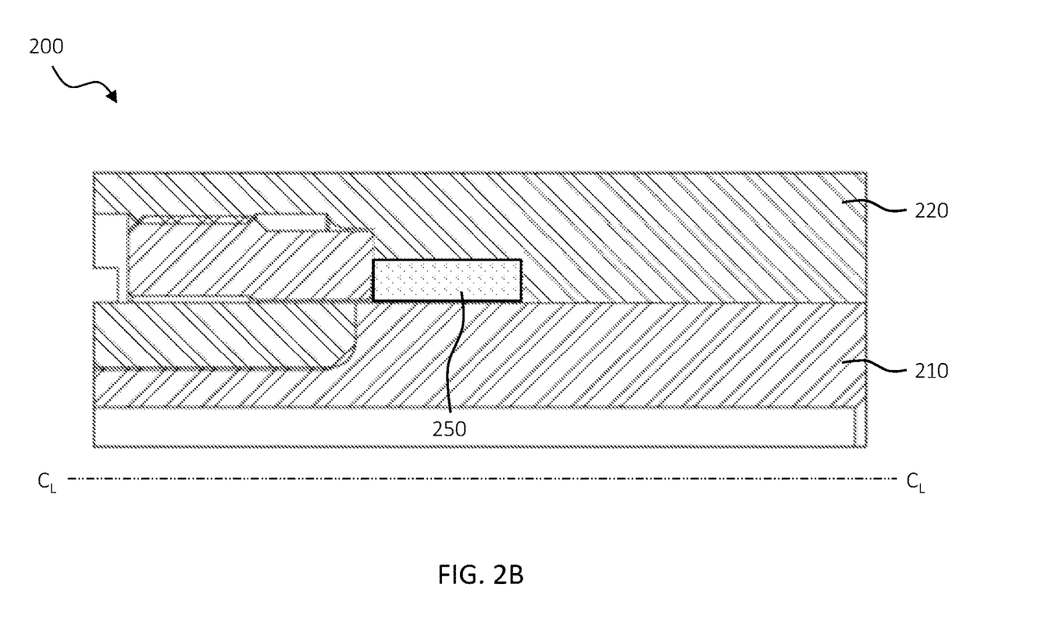

Turning to FIGS. 2A and 2B, depicted are various different manufacturing states for a seal assembly 200 designed, manufactured, and operated according to the disclosure. FIG. 2A illustrates the seal assembly 200 pre-expansion, whereas FIG. 2B illustrates the seal assembly 200 post-expansion. As disclosed above, the pre-expansion expandable metal may be subjected to the reactive fluid within the wellbore, for example relying on the Bernoulli Effect, or may be subjected to the reactive fluid outside of the wellbore.

The seal assembly 200, in the illustrated embodiment of FIGS. 2A and 2B, includes a pipe 210. The pipe 210, in the illustrated embodiment, is centered about a centerline ($C_L$). The seal assembly 200, in at least the embodiment of FIGS. 2A and 2B, additionally includes an outer tubular 220 positioned around the pipe 210. In accordance with the disclosure, the pipe 210 and the outer tubular 220 form an enclosed seal gland 230. The enclosed seal gland 230, in one or more embodiments, includes a width (w) and a height (h), and furthermore may circle the centerline ($C_L$). In at least one embodiment, the width (w) is less than 5 cm, and the height is less than about 1 cm. In accordance with this embodiment, the enclosed seal gland 230 might have a seal gland volume of no more than 100 cm$^3$.

With reference to FIG. 2A, pre-expansion expandable metal 240 is located at least partially within the enclosed seal gland 230. The pre-expansion expandable metal 240, in accordance with one or more embodiments of the disclosure, comprises a metal configured to expand in response to hydrolysis. The pre-expansion expandable metal 240, in the illustrated embodiment, may comprise any of the expandable metals discussed above. The pre-expansion expandable metal 240 may have a variety of different lengths and thicknesses, for example depending on the size of the enclosed seal gland 230, and remain within the scope of the disclosure.

With reference to FIG. 2B, illustrated is the pre-expansion expandable metal 240 illustrated in FIG. 2A after subjecting it to a reactive fluid to expand the metal in the enclosed seal gland 230, and thereby form the expanded metal 250. In the illustrated embodiment, the expanded metal 250 fills the enclosed seal gland 230. The expanded metal 250 may have a variety of different volumes and remain within the scope of the disclosure. Such volumes, as expected, are a function of the size of the enclosed seal gland 230, among other factors.

In the illustrated embodiment of FIGS. 2A and 2B, the expanded metal 250 forms an expanded metal seal within the enclosed seal gland 230. For example, in at least one or more embodiments, the expanded metal seal is operable to seal the enclosed seal gland 230. In at least one embodiment, such as is shown, the expanded metal seal is the only seal located within the enclosed seal gland 230. Other embodiments may exist, however, wherein more than one seal resides within the enclosed seal gland 230.

In at least one embodiment, the enclosed seal gland 230 includes unwanted particulate matter, such as sand, proppant, etc. Unique to the present disclosure, the expanded metal 250 conforms to, and is not substantially affected by, the unwanted particulate matter. Accordingly, the expanded metal is particulate tolerant.

Figure 3A:
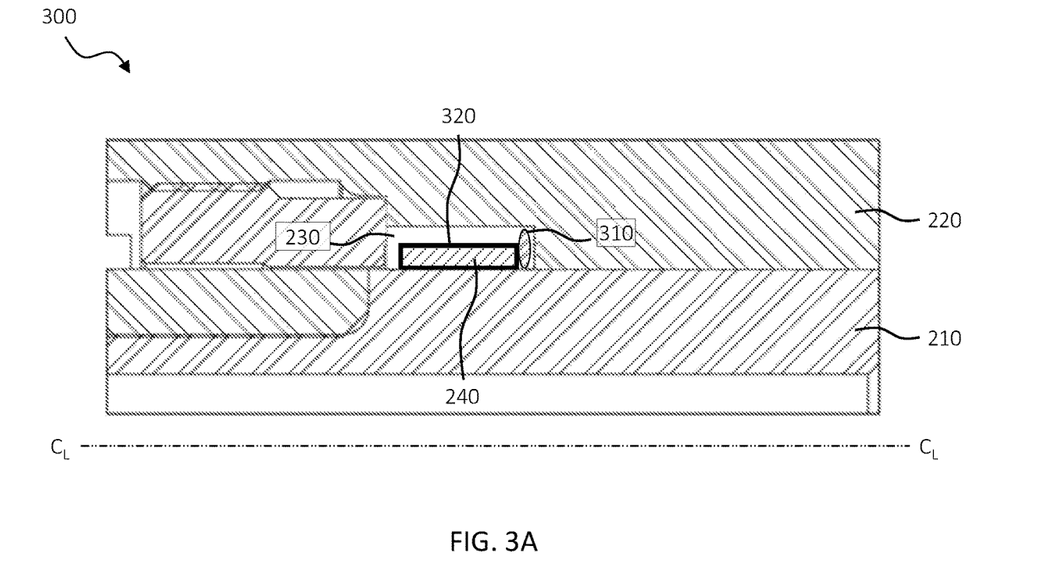
FIGS. 3A and 3B depict various different manufacturing states for a seal assembly designed, manufactured, and operated according to an alternative embodiment of the disclosure.
Figure 3B:
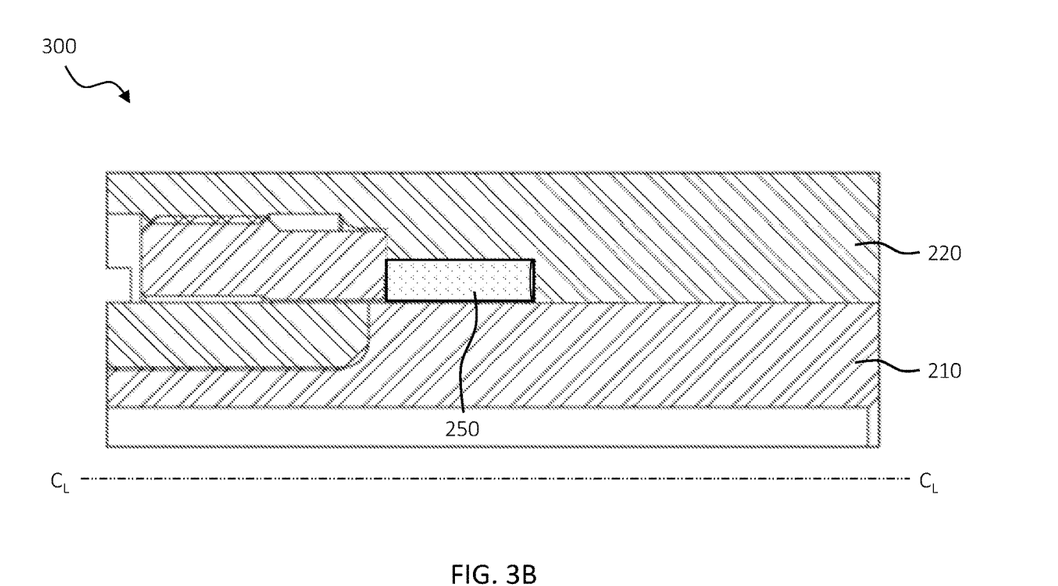

Turning to FIGS. 3A and 3B, depicted are various different manufacturing states for a seal assembly 300 designed, manufactured, and operated according to an alternative embodiment of the disclosure. FIG. 3A illustrates the seal assembly 300 pre-expansion, whereas FIG. 3B illustrates the seal assembly 300 post-expansion. The seal assembly 300 of FIGS. 3A and 3B is similar in many respects to the seal assembly 200 of FIGS. 2A and 2B. Accordingly, like reference numbers have been used to illustrate similar, if not identical, features. The seal assembly 300 differs, for the most part, from the seal assembly 200, in that the seal assembly 300 additionally includes a reactive fluid enclosure 310 located proximate and/or within the enclosed seal gland 230. The reactive fluid enclosure 310, in on or more embodiments, is a reactive fluid sac that is configured to melt, degrade, leak, rupture, or pierce at a desired time. For example, the reactive fluid sac could be configured to rupture when the pipe 210 and the outer tubular 220 are brought into contact with one another, and thus start the process of subjecting the pre-expansion expandable metal 240 to the reactive fluid from the reactive fluid sac to form the expanded metal 250.

The seal assembly 300 of FIGS. 3A and 3B additionally includes a coating or barrier 320 substantially enclosing, if not entirely enclosing, the pre-expansion expandable metal 240. As discussed above, the coating or barrier 320 may be a delay coating or barrier configured to delay the activation of the pre-expansion expandable metal 240 when it is contacted by the reactive fluid (e.g., the reactive fluid from the reactive fluid enclosure 310). Those skilled in the art understand the materials that the coating or barrier could comprise while staying within the scope of the disclosure.

Figure 4A:
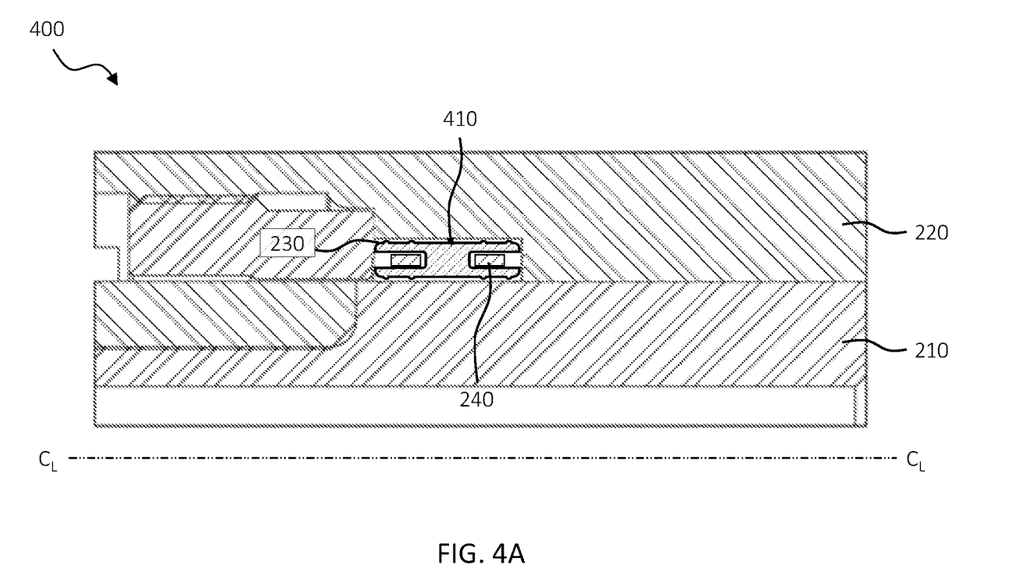
FIGS. 4A through 4E depict various different manufacturing states for a seal assembly designed, manufactured, and operated according to an alternative embodiment of the disclosure.
Figure 4B:
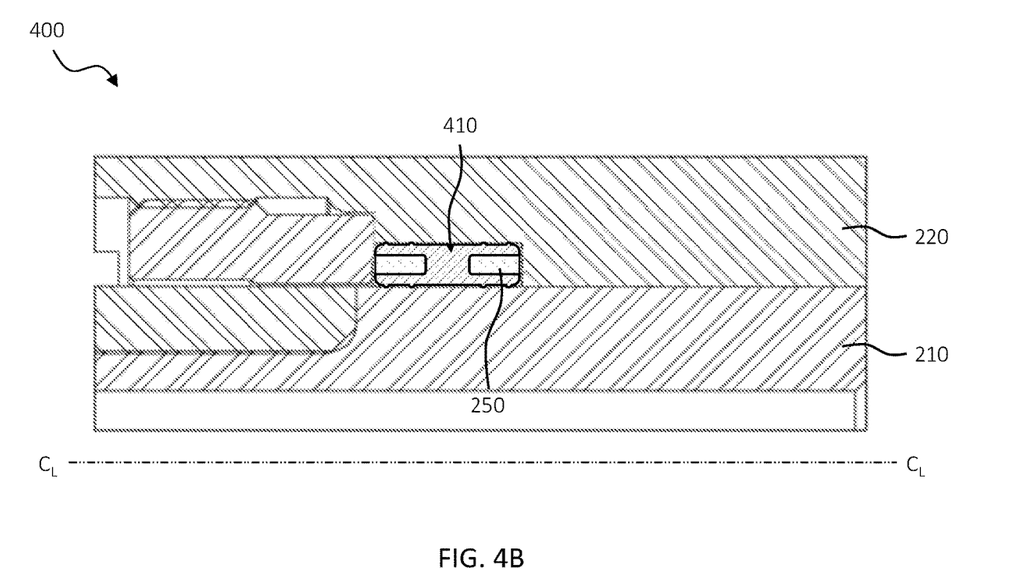

Turning to FIGS. 4A and 4B, depicted are various different manufacturing states for a seal assembly 400 designed, manufactured and operated according to an alternative embodiment of the disclosure. FIG. 4A illustrates the seal assembly 400 pre-expansion, whereas FIG. 4B illustrates the seal assembly 400 post-expansion. The seal assembly 400 of FIGS. 4A and 4B is similar in many respects to the seal assembly 200 of FIGS. 2A and 2B. Accordingly, like reference numbers have been used to illustrate similar, if not identical, features. The seal assembly 400 differs, for the most part, from the seal assembly 200, in that the seal assembly 400 includes a metal seal 410 located within the enclosed seal gland 230. For example, in this embodiment, the pre-expansion expandable metal 240 is positioned in the enclosed seal gland 230 and proximate the metal seal 410, such that when the pre-expansion expandable metal 240 is subjected to the reactive fluid, it expands into the expanded metal, and thus activates the metal seal 410 against the outer tubular 220 or the pipe 210 to seal the enclosed seal gland 230. Thus, in the embodiment of FIGS. 4A and 4B, a metal-to-metal seal is formed with at least one, if not both, of the outer tubular 220 or the pipe 210.

Figure 4C:
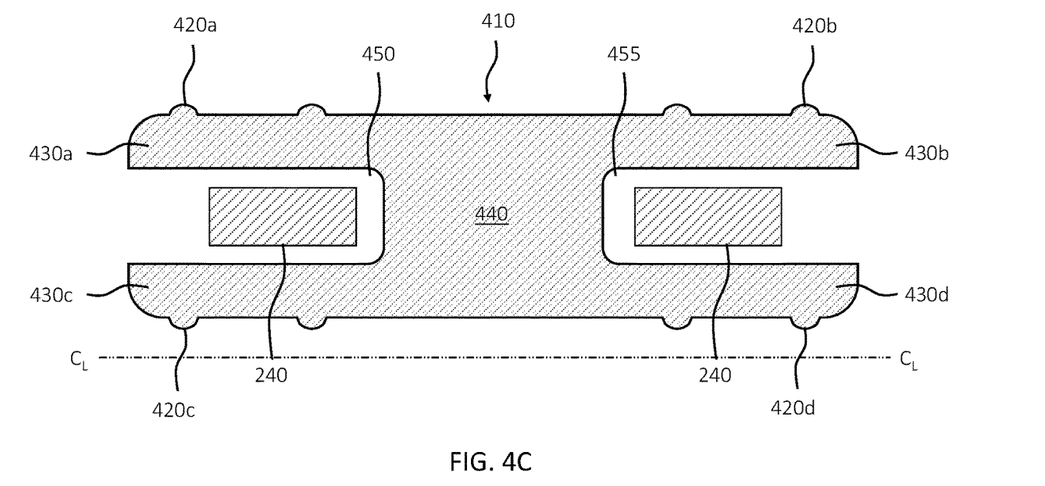
Figure 4D:
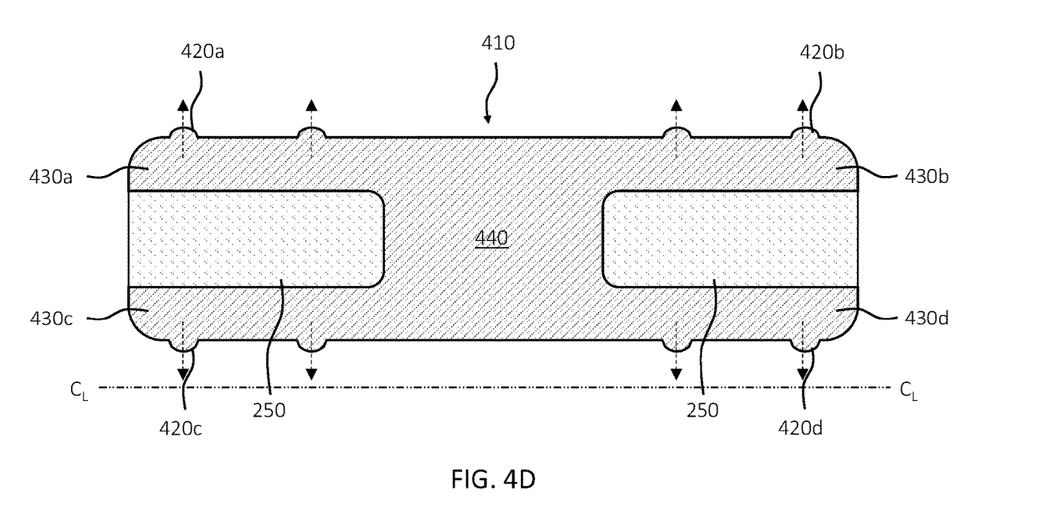
Figure 4E:
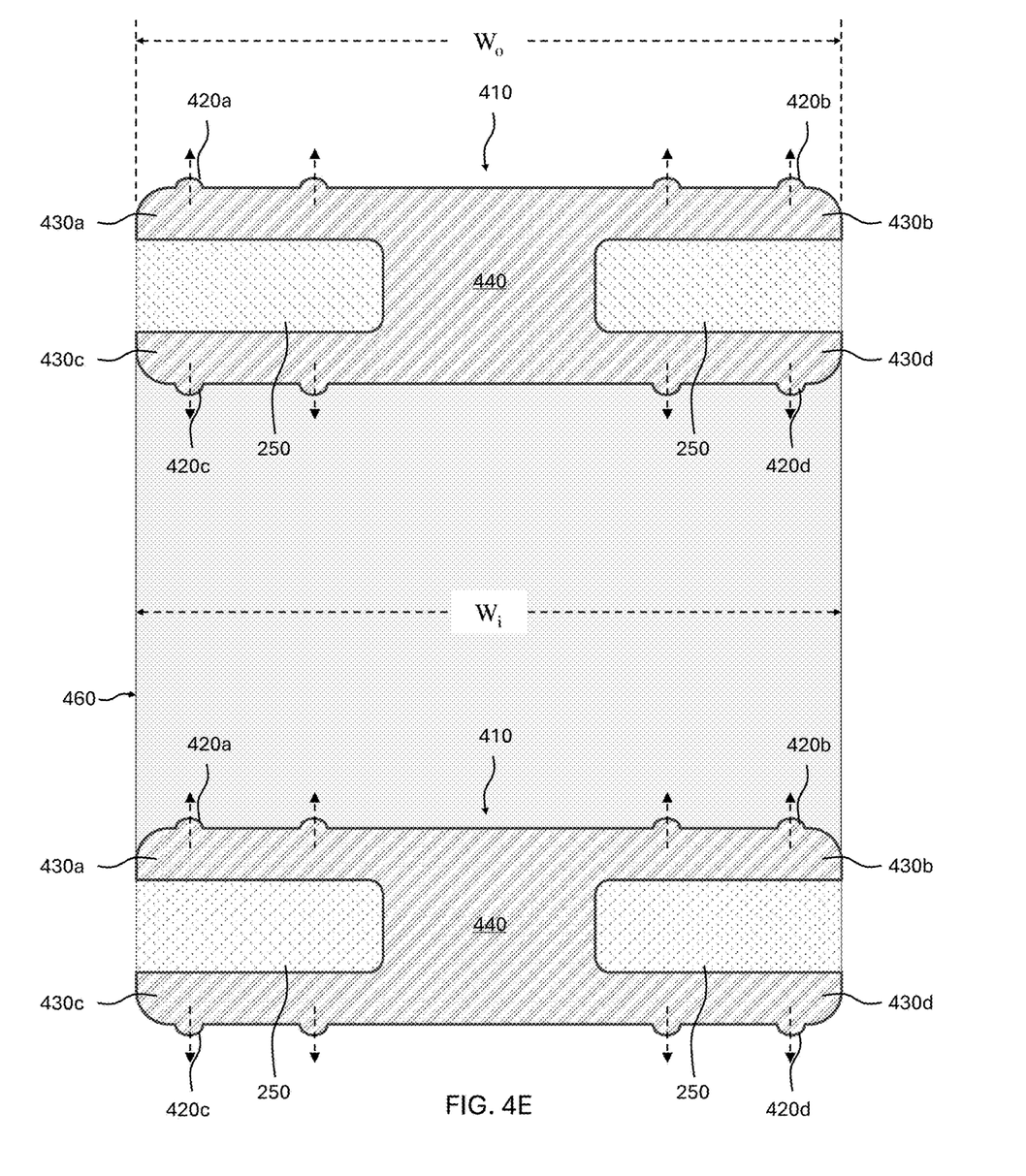

Referring now to FIGS. 4C and 4E, illustrated are enlarged scale cross-sectional views of the metal seal 410, and pre-expansion metal 240 and expanded metal 250 illustrated in FIGS. 4A and 4B, respectively. The metal seal 410 illustrated in FIGS. 4C and 4E is an I-shaped metal seal. For example, in at least one embodiment, the metal seal 410 includes radially outwardly projecting metal sealing surfaces 420a, 420b on each of two arms 430a, 430b extending in opposite directions from a central feature 440. Similarly, the metal seal 410 includes radially inwardly projecting metal sealing surfaces 420c, 420d on each of two arms 430c, 430d extending in opposite directions from the central feature 440. The metal sealing surfaces 420a, 420b, 420c, 420d are preferably made of strong, durable, and resilient metals, such as Inconel 718, 13-chrome steel, etc. It should be clearly understood that any metal materials may be used for the metal sealing surfaces 420a, 420b, 420c, 420d in keeping with the principles of this disclosure.

Between the pairs of arms 430a,430b, and 430c, 430d, and separated by the central feature 440, are recesses 450, 455. In the embodiment of FIGS. 4C and 4E, the recesses 450, 455 are axially displaced about the central feature 440. As is illustrated in FIG. 4C, the pre-expansion metal 240 is positioned within the recesses 450, 455, as described below. As is further illustrated in FIG. 4D, expanded metal 250 is positioned within the recesses 450, 455, as described below. The metal sealing surfaces 420a, 420b, 420c, 420d are used to seal against one or both of the pipe or outer tubular (FIGS. 4A and 4B), as described below. If one or both of the pipe or outer tubular (FIGS. 4A and 4B) are made of a metal, then a metal-to-metal seal will be formed between the metal sealing surfaces 420a, 420b, 420c, 420d. The arms 430a, 430b are sufficiently resilient to bias the metal sealing surfaces 420a, 420b into sealing contact with the outer tubular. Similarly, the arms 430c, 430c are sufficiently resilient to bias the metal sealing surfaces 420c, 420d into sealing contact with the pipe. As further illustrated in FIG. 4E, the metal seal 410 has an inside width (Wi), an outside width (Wo), and a circumference (C). The inside width (Wi), outside width (Wo), and circumference (C) form a footprint 460 for the metal seal 410. As further illustrated in FIG. 4E, the expanded metal seal 250 does not radially or axially outside of the footprint 460.

Differential pressure from the pre-expansion metal 240 expanding in response to hydrolysis (e.g., thus becoming the expanded metal 250) applied to either of the recesses 450, 455 will also cause the pairs of arms 430a,430b, and 430c, 430d to be biased radially outward and inward (as shown by the arrows), respectively, thereby increasing contact pressure between the metal sealing surfaces 420a, 420b, 420c, 420d and the radially exterior outer tubular and radially interior pipe. As is illustrated, each of the pairs of arms 430a,430b, and 430c, 430d may include multiple metal sealing surfaces.

Figure 5A:
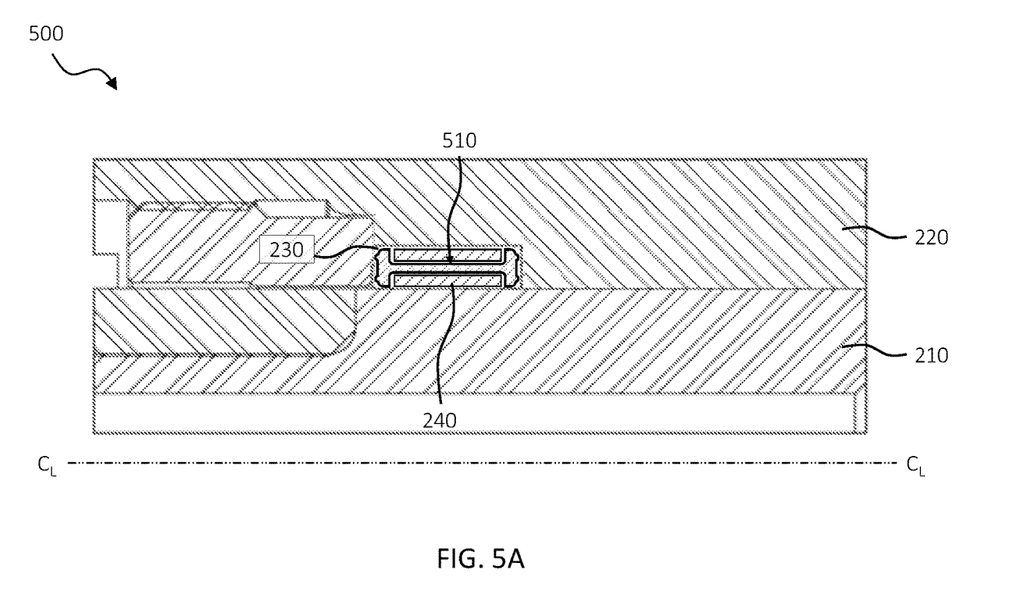
FIGS. 5A through 5D depict various different manufacturing states for a seal assembly designed, manufactured, and operated according to an alternative embodiment of the disclosure.
Figure 5B:
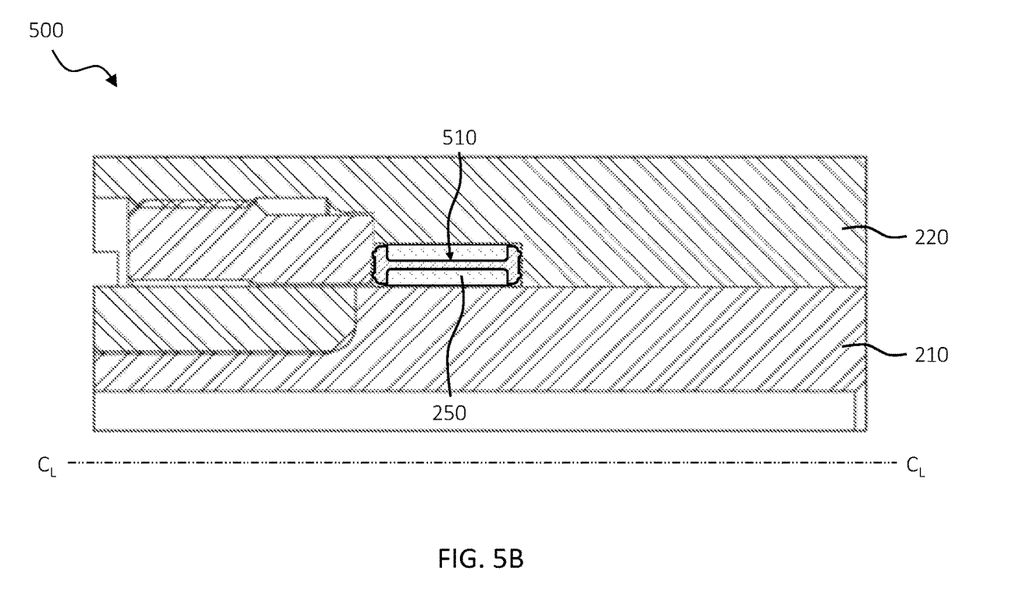

Turning to FIGS. 5A and 5B, depicted are various different manufacturing states for a seal assembly 500 designed, manufactured and operated according to an alternative embodiment of the disclosure. FIG. 5A illustrates the seal assembly 500 pre-expansion, whereas FIG. 5B illustrates the seal assembly 500 post-expansion. The seal assembly 500 of FIGS. 5A and 5B is similar in many respects to the seal assembly 400 of FIGS. 4A and 4B. Accordingly, like reference numbers have been used to illustrate similar, if not identical, features. The seal assembly 500 differs, for the most part, from the seal assembly 400, in that the metal seal 510 illustrated in FIGS. 5C and 5D is an I-shaped metal seal that has been rotated by 90 degrees relative to the metal seal 410.

Figure 5C:
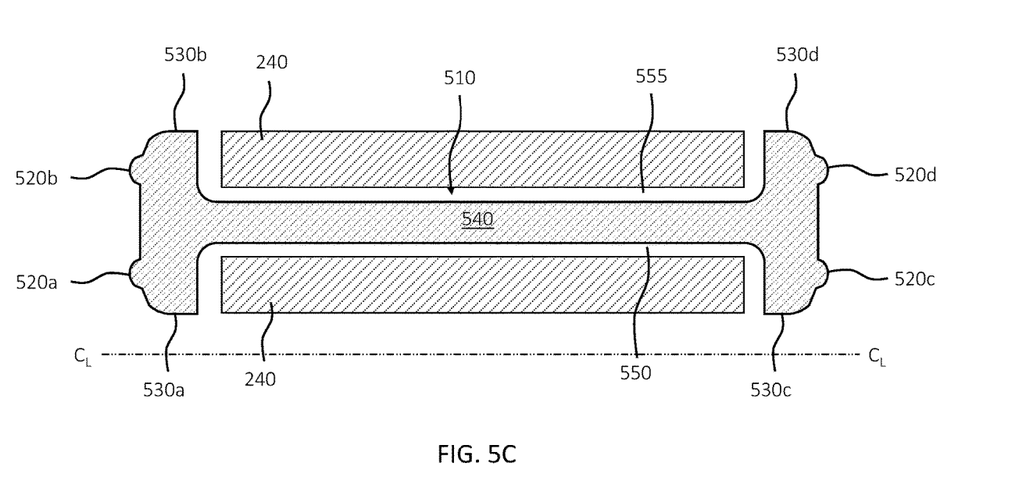
Figure 5D:
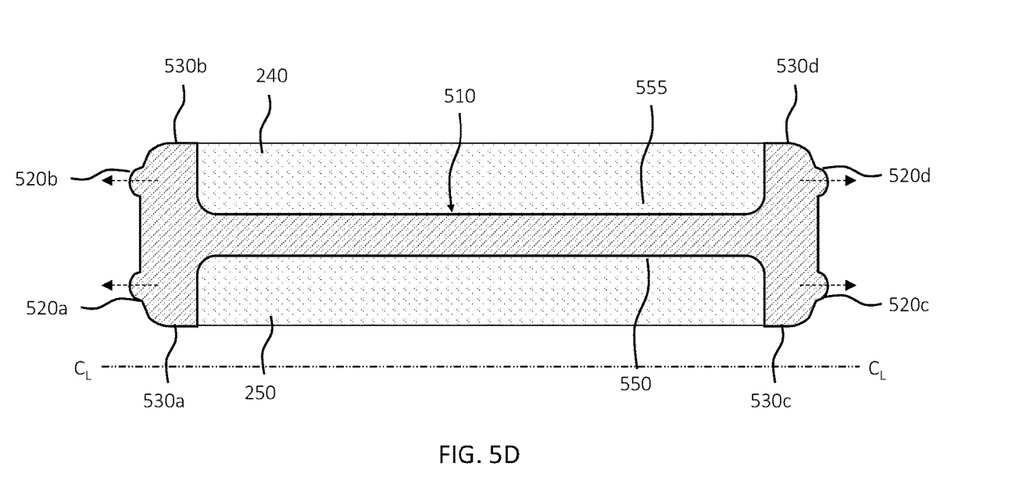

Referring now to FIGS. 5C and 5D, illustrated are enlarged scale cross-sectional views of the metal seal 510 and pre-expansion metal 240 and expanded metal 250 illustrated in FIGS. 5A and 5B, respectively. The metal seal 510 illustrated in FIGS. 5C and 5D is an I-shaped metal seal, but the I-shaped metal seal of FIGS. 5C and 5D is rotated by about 90 degrees relative to the I-shaped metal seal of FIGS. 4C and 4D. For example, in at least one embodiment, the metal seal 510 includes axially projecting metal sealing surfaces 520a, 520b on each of two arms 530a, 530b extending in opposite directions from a central feature 540. Similarly, the metal seal 510 includes axially projecting metal sealing surfaces 520c, 520d on each of two arms 530c, 530d extending in opposite directions from the central feature 540. The metal sealing surfaces 520a, 520b, 520c, 520d are preferably made of strong, durable, and resilient metals, such as Inconel 718, 13-chrome steel, etc. It should be clearly understood that any metal materials may be used for the metal sealing surfaces 520a, 520b, 520c, 520d in keeping with the principles of this disclosure.

Between the pairs of arms 530a, 530b, and 530c, 530d, and separated by the central feature 540, are recesses 550, 555. In the embodiment of FIGS. 5C and 5D, the recesses 550, 555 are radially displaced about the central feature 540. As is illustrated in FIG. 5C, the pre-expansion metal 240 is positioned within the recesses 550, 555. As is further illustrate in FIG. 5D, expanded metal 250 is positioned within the recesses 550, 555. The metal sealing surfaces 520a, 520b, 520c, 520d are used to seal against one or both of the pipe or outer tubular (FIGS. 5A and 5B).

Differential pressure from the pre-expansion metal 240 expanding in response to hydrolysis (e.g., thus becoming the expanded metal 250) applied to either of the recesses 550, 555 will also cause the pairs of arms 530a, 530b, and 530c, 530d to be biased axially uphole and downhole, respectively. As is illustrated, each of the pairs of arms 530a, 530b, and 530c, 530d may include multiple metal sealing surfaces.

Figure 6A:
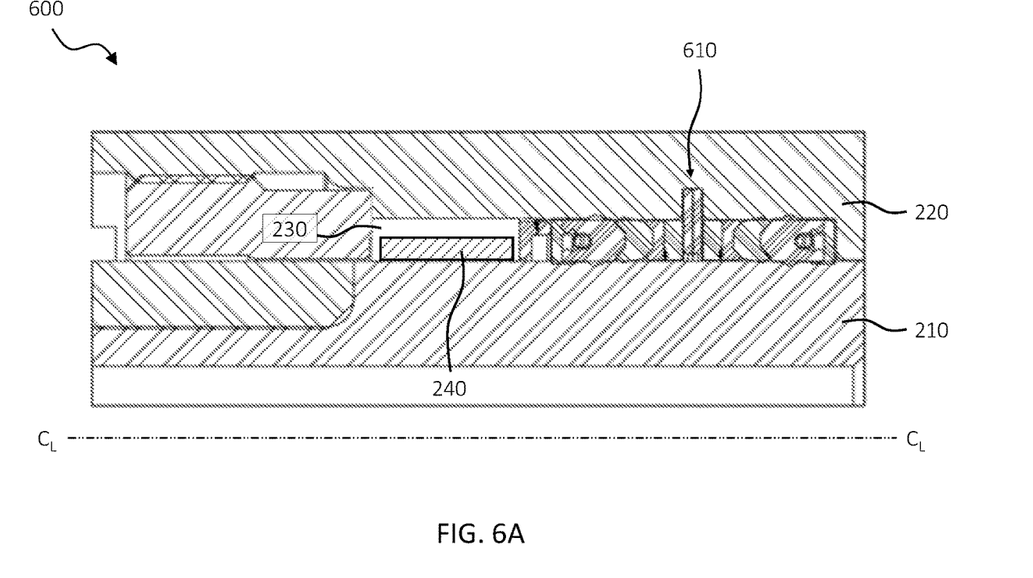
FIGS. 6A and 6B depict various different manufacturing states for a seal assembly designed, manufactured, and operated according to an alternative embodiment of the disclosure.
Figure 6B:
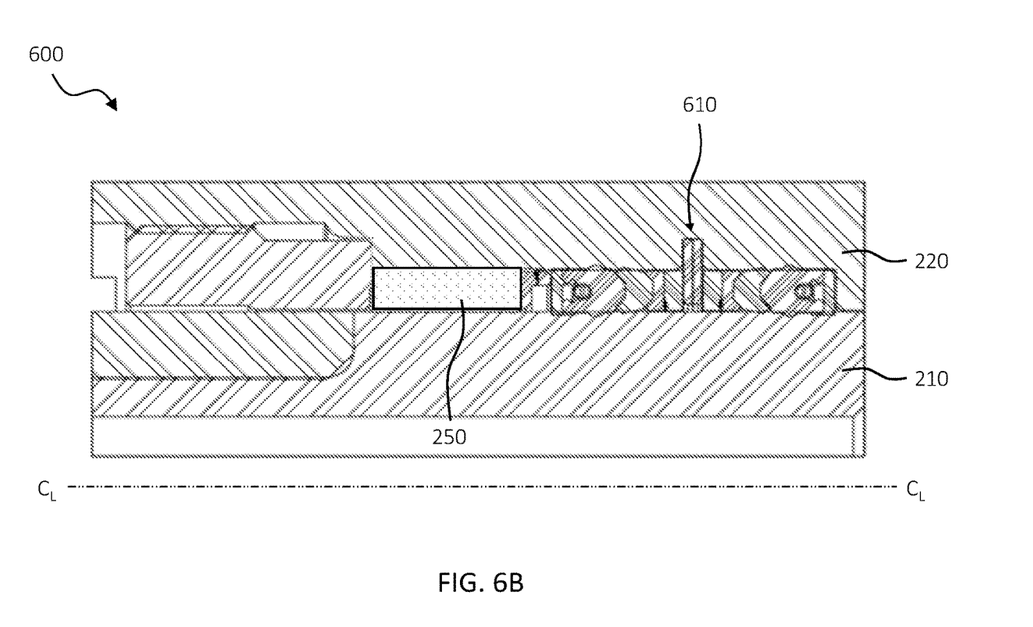

Turning to FIGS. 6A and 6B, depicted are various different manufacturing states for a seal assembly 600 designed, manufactured and operated according to an alternative embodiment of the disclosure. FIG. 6A illustrates the seal assembly 600 pre-expansion, whereas FIG. 6B illustrates the seal assembly 600 post-expansion. The seal assembly 600 of FIGS. 6A and 6B is similar in many respects to the seal assembly 200 of FIGS. 2A and 2B. Accordingly, like reference numbers have been used to illustrate similar, if not identical, features. The seal assembly 600 differs, for the most part, from the seal assembly 200, in that the seal assembly 600 includes a second elastomeric seal 610 positioned within the enclosed seal gland 230. Thus, in accordance with this embodiment, when the expanded metal is in an expanded state it axially activates the second elastomeric seal 610 to further seal the enclosed seal gland 230. While a specific chevron type elastomeric seal has been illustrated in FIG. 6, any type of elastomeric seal could be used and remain within the scope of the present disclosure.

Figure 7A:
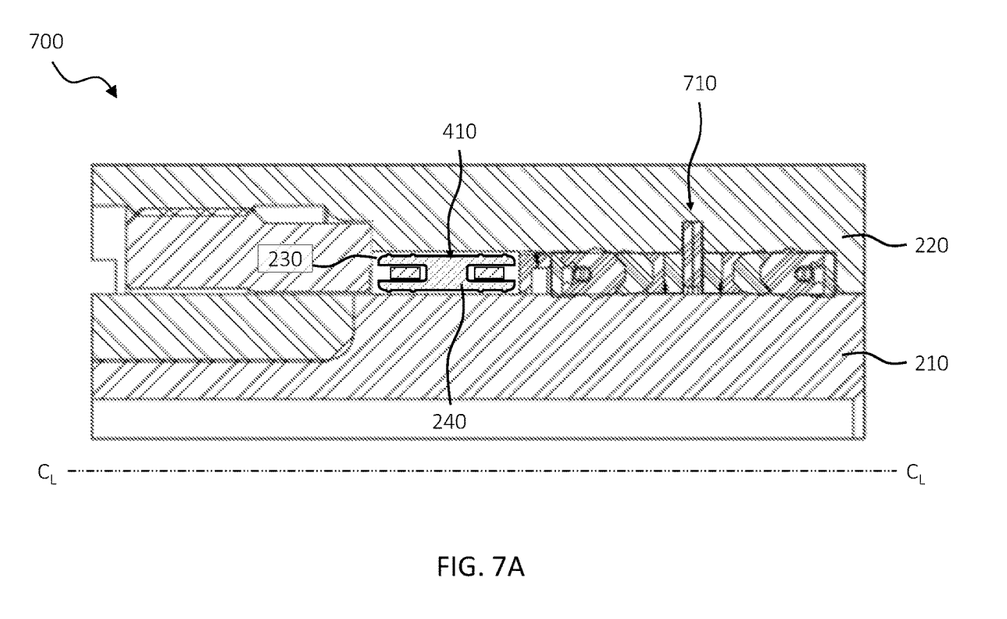
FIGS. 7A and 7B depict various different manufacturing states for a seal assembly designed, manufactured, and operated according to an alternative embodiment of the disclosure.
Figure 7B:
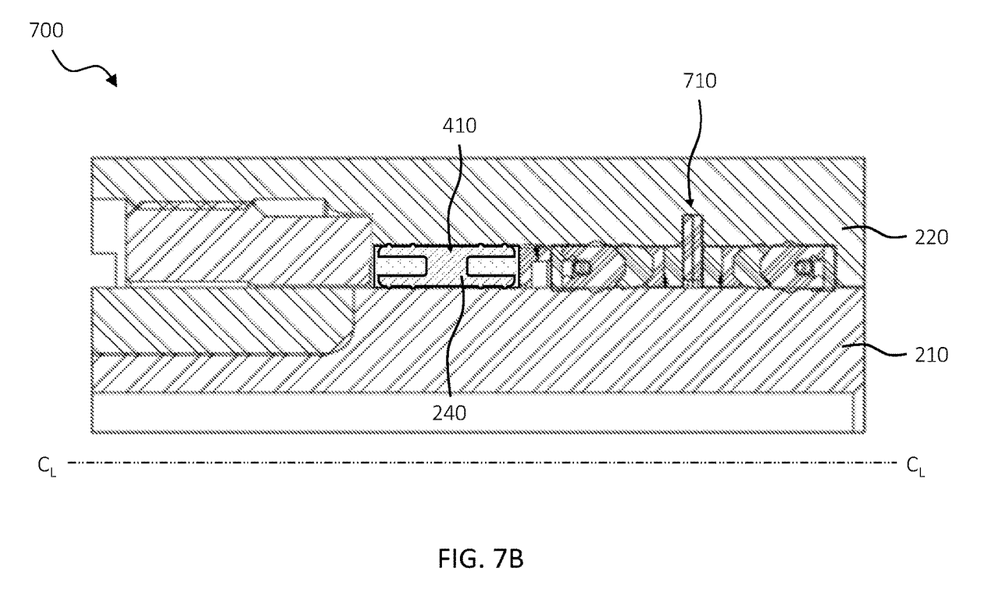

Turning to FIGS. 7A and 7B, depicted are various different manufacturing states for a seal assembly 700 designed, manufactured and operated according to an alternative embodiment of the disclosure. FIG. 7A illustrates the seal assembly 700 pre-expansion, whereas FIG. 7B illustrates the seal assembly 700 post-expansion. The seal assembly 700 of FIGS. 7A and 7B is similar in many respects to the seal assembly 400 of FIGS. 4A and 4B. Accordingly, like reference numbers have been used to illustrate similar, if not identical, features. The seal assembly 700 differs, for the most part, from the seal assembly 400, in that the seal assembly 700 includes a second elastomeric seal 710 positioned within the enclosed seal gland 230. Thus, in accordance with this embodiment, when the expanded metal is in an expanded state it also axially activates the second elastomeric seal 710 to further seal the enclosed seal gland 230.

Aspects disclosed herein include:

A. A seal assembly, the seal assembly including: 1) a pipe; 2) an outer tubular positioned around the pipe, the outer tubular and pipe forming an enclosed seal gland; and 3) expanded metal positioned within the enclosed seal gland, the expanded metal comprising a metal that has expanded in response to hydrolysis to assist in sealing the enclosed seal gland.

B. A method for sealing, the method including: 1) providing a downhole tool, the downhole tool having a sealing assembly, including: a) a pipe; b) an outer tubular positioned around the pipe, the outer tubular and pipe forming an enclosed seal gland; and c) pre-expansion expandable metal positioned within the enclosed seal gland, the pre-expansion expandable metal comprising a metal configured to expand in response to hydrolysis; and 2) subjecting the pre-expansion expandable metal to reactive fluid to form an expanded metal in the enclosed seal gland and thereby assist in sealing the enclosed seal gland.

C. A well system, the well system including: 1) a wellbore extending through one or more subterranean formations; and 2) a downhole tool located within the wellbore, the downhole tool having a seal assembly, the seal assembly including: a) a pipe; b) an outer tubular positioned around the pipe, the outer tubular and pipe forming an enclosed seal gland; and c) expanded metal positioned within the enclosed seal gland, the expanded metal comprising a metal that has expanded in response to hydrolysis to assist in sealing the enclosed seal gland.

Aspects A, B, and C may have one or more of the following additional elements in combination: Element 1: wherein the expanded metal is an expanded metal seal operable to seal the enclosed seal gland. Element 2: wherein the expanded metal seal is a first seal, and further including a second elastomeric seal positioned within the enclosed seal gland. Element 3: wherein the expanded metal seal is in an expanded state axially activating the second elastomeric seal to further seal the enclosed seal gland. Element 4: further including a metal seal located within the enclosed seal gland, wherein the expanded metal is in an expanded state activating the metal seal against the outer tubular or the pipe to seal the enclosed seal gland. Element 5: wherein the metal seal is an I-shaped metal seal having pairs of arms separated by a central feature, the pairs of arms and central feature forming first and second recesses, and further wherein the expanded metal is in an expanded state within the first and second recesses thereby activating the pairs of arms against ones of the outer tubular or the pipe to seal the enclosed seal gland. Element 6: wherein the expanded metal is in an expanded state within the first and second recesses thereby radially activating the pairs of arms against ones of the outer tubular and the pipe to seal the enclosed seal gland. Element 7: wherein the expanded metal is in an expanded state within the first and second recesses thereby axially activating the pairs of arms against ones of the outer tubular or the pipe to seal the enclosed seal gland. Element 8: wherein the metal seal is a first seal, and further including a second elastomeric seal positioned within the enclosed seal gland. Element 9: wherein the expanded metal is in an expanded state axially activating the second elastomeric seal to further seal the enclosed seal gland. Element 10: wherein the expanded metal includes residual unreacted metal. Element 11: wherein subjecting the pre-expansion expandable metal to reactive fluid occurs outside of a wellbore, and further including positioned the downhole tool having the expanded metal within the wellbore. Element 12: wherein providing the downhole tool includes providing the downhole tool within a wellbore, and subjecting the pre-expansion expandable metal to the reactive fluid occurs inside the wellbore. Element 13: wherein the expanded metal is a first expanded metal seal, and further including a second elastomeric seal positioned within the enclosed seal gland, and further wherein the subjecting the pre-expansion expandable metal to the reactive fluid to form the expanded metal axially activates the second elastomeric seal to further seal the enclosed seal gland. Element 14: further including a metal seal located within the enclosed seal gland, and further wherein the subjecting the pre-expansion expandable metal to the reactive fluid to form the expanded metal activates the metal seal against the outer tubular or the pipe to seal the enclosed seal gland. Element 15: wherein the metal seal is an I-shaped metal seal having pairs of arms separated by a central feature, the pairs of arms and central feature forming first and second recesses, the pre-expansion expandable metal located within the first and second recesses, and further wherein the subjecting the pre-expansion expandable metal to the reactive fluid to form the expanded metal activates the pairs of arms against ones of the outer tubular or the pipe to seal the enclosed seal gland. Element 16: wherein the subjecting the pre-expansion expandable metal to the reactive fluid to form the expanded metal radially activates the pairs of arms against ones of the outer tubular or the pipe to seal the enclosed seal gland. Element 17: wherein the subjecting the pre-expansion expandable metal to the reactive fluid to form the expanded metal axially activates the pairs of arms against ones of the outer tubular or the pipe to seal the enclosed seal gland. Element 18: wherein the I-shaped metal seal is a first metal seal, and further including a second elastomeric seal positioned within the enclosed seal gland, and further wherein the subjecting the pre-expansion expandable metal to the reactive fluid to form the expanded metal axially activates the second elastomeric seal to further seal the enclosed seal gland.

Those skilled in the art to which this application relates will appreciate that other and further additions, deletions, substitutions, and modifications may be made to the described embodiments.

What is claimed is:

1. A seal assembly, comprising:
    a pipe;
    an outer tubular positioned around the pipe, the outer tubular and pipe forming an enclosed seal gland;

an I-shaped metal seal located within the enclosed seal gland, the I-shaped metal seal having pairs of arms separated by a central feature, the pairs of arms and central feature forming first and second recesses, the first and second recesses radially separated by the central feature, the I-shaped seal forming a footprint; and expanded metal positioned within the first and second recesses, the expanded metal comprising a metal that has expanded in response to hydrolysis to assist in sealing the enclosed seal gland, the expanded metal axially activating the pairs of arms against ones of the outer tubular or the pipe to seal the enclosed seal gland, without extending radially outside of the footprint of the I-shaped seal and without extending axially outside of the footprint of the I-shaped seal.

2. The seal assembly as recited in claim 1, wherein the expanded metal is an expanded metal seal operable to seal the enclosed seal gland.

3. The seal assembly as recited in claim 2, wherein the expanded metal seal is a first seal, and further including a second elastomeric seal positioned within the enclosed seal gland.

4. The seal assembly as recited in claim 3, wherein the expanded metal seal is in an expanded state axially activating the second elastomeric seal to further seal the enclosed seal gland.

5. The seal assembly as recited in claim 1, wherein the I-shaped metal seal is a first seal, and further including a second elastomeric seal positioned within the enclosed seal gland.

6. The seal assembly as recited in claim 5, wherein the expanded metal is in an expanded state axially activating the second elastomeric seal to further seal the enclosed seal gland.

7. The seal assembly as recited in claim 1, wherein the expanded metal includes residual unreacted metal.

8. A method for sealing, comprising:
providing a downhole tool, the downhole tool having a sealing assembly, including:
a pipe;
an outer tubular positioned around the pipe, the outer tubular and pipe forming an enclosed seal gland;
an I-shaped metal seal located within the enclosed seal gland, the I-shaped metal seal having pairs of arms separated by a central feature, the pairs of arms and central feature forming first and second recesses, the first and second recesses radially separated by the central feature, the I-shaped seal forming a footprint; and
pre-expansion expandable metal positioned within the first and second recesses, the pre-expansion expandable metal comprising a metal configured to expand in response to hydrolysis, the pre-expansion expandable metal configured to axially activate the pairs of arms against ones of the outer tubular or the pipe to seal the enclosed seal gland; and subjecting the pre-expansion expandable metal to reactive fluid to form an expanded metal in the enclosed seal gland and thereby assist in sealing the enclosed seal gland, wherein the expanded metal does not extend radially outside of the footprint of the I-shaped seal and does not extend axially outside of the footprint of the I-shaped seal.

9. The method as recited in claim 8, wherein subjecting the pre-expansion expandable metal to reactive fluid occurs outside of a wellbore, and further including positioned the downhole tool having the expanded metal within the wellbore.

10. The method as recited in claim 8, wherein providing the downhole tool includes providing the downhole tool within a wellbore, and subjecting the pre-expansion expandable metal to the reactive fluid occurs inside the wellbore.

11. The method as recited in claim 8, wherein the expanded metal is a first expanded metal seal, and further including a second elastomeric seal positioned within the enclosed seal gland, and further wherein the subjecting the pre-expansion expandable metal to the reactive fluid to form the expanded metal axially activates the second elastomeric seal to further seal the enclosed seal gland.

12. The method as recited in claim 8, wherein the I-shaped metal seal is a first metal seal, and further including a second elastomeric seal positioned within the enclosed seal gland, and further wherein the subjecting the pre-expansion expandable metal to the reactive fluid to form the expanded metal axially activates the second elastomeric seal to further seal the enclosed seal gland.

13. A well system, comprising:
a wellbore extending through one or more subterranean formations; and
a downhole tool located within the wellbore, the downhole tool having a seal assembly, the seal assembly including:
a pipe;
an outer tubular positioned around the pipe, the outer tubular and pipe forming an enclosed seal gland;
an I-shaped metal seal located within the enclosed seal gland, the I-shaped metal seal having pairs of arms separated by a central feature, the pairs of arms and central feature forming first and second recesses, the first and second recesses radially separated by the central feature, the I-shaped seal forming a footprint; and
expanded metal positioned within the first and second recesses, the expanded metal comprising a metal that has expanded in response to hydrolysis to assist in sealing the enclosed seal gland, the expanded metal axially activating the pairs of arms against ones of the outer tubular or the pipe to seal the enclosed seal gland, without extending radially outside of the footprint of the I-shaped seal and without extending axially outside of the footprint of the I-shaped seal.

* * * * *